US012772976B2

(12) United States Patent
Brierley

(10) Patent No.: US 12,772,976 B2
(45) **Date of Patent: *Oct. 27, 2026**

(54) BIOCIDAL FORMULATIONS AND AQUEOUS COMPOSITIONS

(71) Applicant: ASPIRE TECHNOLOGY GROUP LTD, St Albans (GB)

(72) Inventor: Gary Brierley, St Albans (GB)

(73) Assignee: ASPIRE TECHNOLOGY GROUP LTD, St Albans (GB)

( * ) Notice: Subject to any disclaimer, the term of this patent is extended or adjusted under 35 U.S.C. 154(b) by 0 days.

This patent is subject to a terminal disclaimer.

(21) Appl. No.: 19/319,256

(22) Filed: Sep. 4, 2025

(65) Prior Publication Data

US 2026/0068878 A1 Mar. 12, 2026

(51) Int. Cl.

| | |
|---|---|
| ***A01N 25/30*** | (2006.01) |
| ***A01N 25/04*** | (2006.01) |
| ***A01N 31/00*** | (2006.01) |
| ***A01N 33/12*** | (2006.01) |
| ***A01P 1/00*** | (2006.01) |

(52) U.S. Cl.

CPC ............. *A01N 25/30* (2013.01); *A01N 25/04* (2013.01); *A01N 31/00* (2013.01); *A01N 33/12* (2013.01); *A01P 1/00* (2021.08)

(58) Field of Classification Search

CPC ...................................................... A01N 25/30

See application file for complete search history.

(56) References Cited

U.S. PATENT DOCUMENTS

| | | | |
|---|---|---|---|
| 2020/0008422 | A1 | 1/2020 | Espinosa Escrig et al. |
| 2020/0078298 | A1 | 3/2020 | Tamarkin et al. |

FOREIGN PATENT DOCUMENTS

| | | | |
|---|---|---|---|
| CN | 104212657 | A1 | 12/2014 |
| CN | 104435607 | A1 | 3/2015 |
| CN | 107823004 | A1 | 3/2018 |
| CN | 108300603 | A1 | 7/2018 |
| CN | 118303393 | A | 7/2024 |
| JP | H0665076 | A | 3/1994 |
| JP | 2020075888 | A | 5/2020 |
| KR | 20030034403 | A | 5/2003 |
| WO | 2009031621 | A1 | 3/2009 |

OTHER PUBLICATIONS

Extended European Search Report for EP application No. 24199065.4, dated Feb. 17, 2025, 15 pages.

Liu, F., et al., "Tetrasodium EDTA is Effective at Eradicating Biofilms Formed by Clinically Relevant Microorganisms for Patients' Central Venous Catheters," Clinical Science and Epidemiology, mSphere (American Society for Microbiology), Nov./Dec. 2018, vol. 3, issue 6, 16 pages.

Matsumura, S., et al., "Surface Activities, Biodegradability and Antimicrobial Properties of n-Alkyl Glucosides, Mannosides and Galactosides," JACCS, Dec. 1990, vol. 67, No. 12, 6 pages.

Zhu, JP, et al., "Enzymatic synthesis of an homologous series of long and very long-chain sucrose esters and evaluation of their emulsifying and biological properties," Food Hydrocolloids, 2022, vol. 124 (107149), 12 pages.

Great Britain Search Report for Application No. GB2514603.6, dated Feb. 19, 2026, 2 pages.

*Primary Examiner* — Golam M Shameem

(74) *Attorney, Agent, or Firm* — Polsinelli PC

(57) ABSTRACT

The present invention concerns a formulation comprising at least one active ingredient that has biocidal properties and an aqueous composition which acts to boost the biocidal activity of the active ingredient(s).

12 Claims, 2 Drawing Sheets

BIOCIDAL FORMULATIONS AND AQUEOUS COMPOSITIONS

FIELD OF INVENTION

Figure 1:
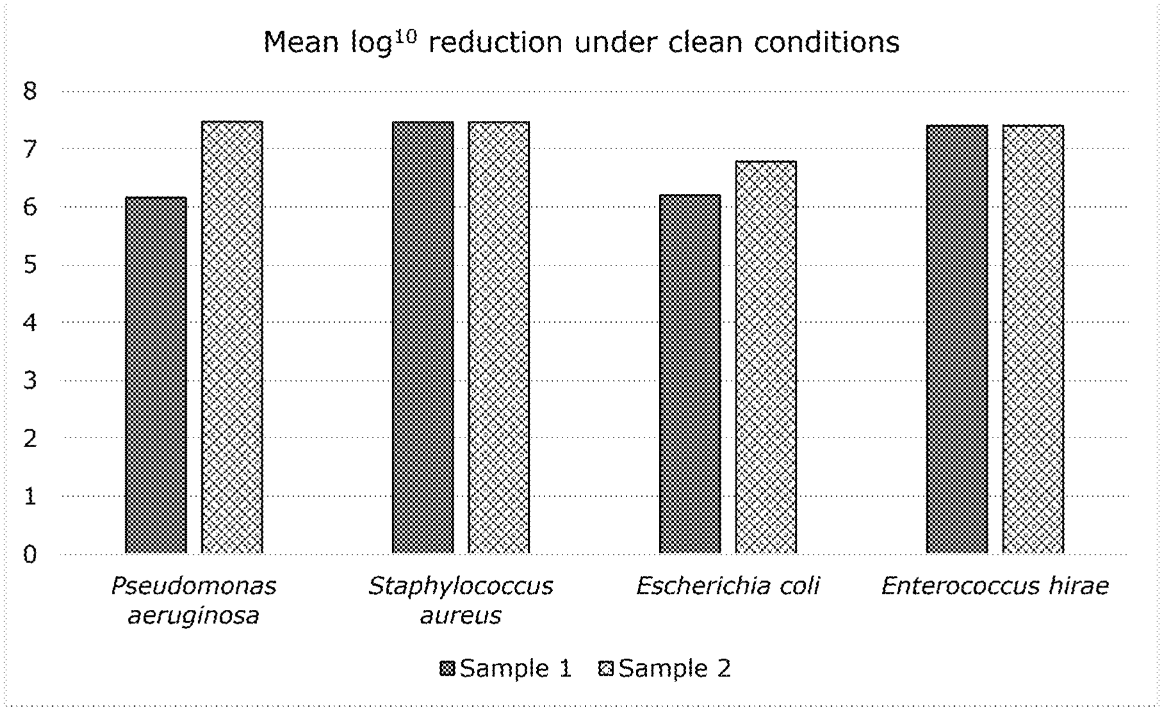

The present invention concerns a formulation comprising at least one active ingredient that has biocidal properties and an aqueous composition which acts to boost the biocidal activity of the active ingredient(s). The advantageous biocidal formulation may be used in a variety of applications and on a wide range of surfaces.

BACKGROUND

Reducing bacterial infections is a global health priority. Common bacterial infections were associated with 7.7 million i.e., one in eight deaths, in 2019 according to studies by the Global Research on Antimicrobial Resistance Project.

Biofilm formation plays a significant role in the spread of bacterial infections. Biofilm formation is a process by which microorganisms attach to and grow on surfaces irreversibly by producing polymers that enable matrix formation. These microbial communities can be established on almost any surface and exhibit radically reduced susceptibility to antimicrobial agents.

Biocidal agents, for example disinfectants are widely used for limiting the spread of infections and for removing bacteria and other microorganisms from various surfaces such as those in the home, clinical settings and the food and drinks industry. However, most disinfectants are potentially harmful or toxic to humans and animals. For example, traditional disinfectants which often include chlorine-releasing agents, alcohols or quaternary ammonium compounds pose health risks such as skin, eye or respiratory irritation, asthma and developmental and reproductive toxicity. These substances can also be fatal to plant species if allowed to build up in soil and can damage surfaces causing the lifespan of items to be shortened.

Therefore, the provision of biocidal formulations that are less environmentally damaging and less toxic without sacrificing biocidal efficacy is desirable.

The inventor has considered these and other problems and has surprisingly found that the present invention can address these and other needs.

SUMMARY OF INVENTION

The present invention concerns a formulation comprising at least one active ingredient that has biocidal properties and an aqueous composition which acts to boost the biocidal activity of those active ingredient(s). The aqueous composition may comprise a sugar ester, a dialkyl ester, a humectant and one or more surfactants. The aqueous composition is a colloid or a suspension and in each instance the aqueous component forming the continuous phase of the aqueous composition is water.

The formulation demonstrates effective biocidal activity. It is envisaged that the biocidal active ingredient(s) and aqueous composition play complimentary roles in reducing levels of, or eradicating microorganisms. For example, it is envisaged that microorganisms are attracted to the sugar-based components of the aqueous composition in the formulation. The biocidal active ingredient(s) of the formulation create an inhospitable environment that the microorganisms are then trapped and subsequently killed in.

It is also envisaged that the formulation acts on the calcium ionic bonds present in bacterial membranes. Calcium is essential for bacterial cell integrity and metabolism and plays a key role in viral infection and fungi metabolism. Calcium also plays an important role in bacterial biofilm formation, helping to strengthen and stabilize the biofilm matrix. Biofilms are particularly difficult to remove because a biofilm matrix mediates cellular adhesion to surfaces and neighbouring cells, leading to the development of three-dimensional biofilm structures. A biofilm matrix also forms the immediate environment for resident bacteria which retains water, nutrients, and extracellular enzymes. This environment protects bacteria from disinfectants, antibiotics, environmental stresses, and the host immune system. It is envisaged that the combination of components in the aqueous composition of the formulation interacts with the calcium ionic bonds in a bacterial membrane and/or biofilm matrix, helping to reduce surface tension and structural integrity. This enables the biocidal active ingredient(s) to penetrate and kill cells more easily. In this way the non-active aqueous composition acts to boost the biocidal activity of the active ingredient(s) of the formulation.

The presence of the aqueous composition in the formulation enables the concentration of the biocidal active ingredient(s) to be decreased without compromising biocidal (e.g. bactericidal) efficacy. Surprisingly, in some cases, combining the aqueous composition with a lower concentration of biocidal actives boosts the biocidal efficacy of the formulation beyond the biocidal efficacy achieved with a formulation containing a higher concentration of biocidal actives in the absence of the aqueous composition. Accordingly, the formulations of the invention are equally if not more effective at killing bacteria than formulations currently available on the market that contain a higher concentration of active ingredients. It is envisaged that a lower concentration of biocidal active(s) ingredients in the formulations may decrease the toxicity of the substances to humans but may also make the formulation less harmful to the environment.

Enabling the concentration of potentially toxic and environmentally harmful biocidal active ingredients to be decreased leads to less build-up of the harmful chemicals in water systems or run off onto soil. The components of the aqueous composition are biodegradable and so can be broken down without having a negative impact on the environment. As such, the present formulations are significantly more environmentally friendly than equivalent formulations that do not contain the aqueous composition.

The formulations of this disclosure can be applied as a biocide or disinfectant to various surfaces and remain stable and active against microorganisms for long periods of time after application. As a result, the formulations can be used in a variety of settings including kitchens, bathrooms, hospitals, care facilities, food and animal handling and processing centres, supermarkets, cosmetic and pharmaceutical manufacturing facilities and recycling centres. The formulations may also be used on a variety of surfaces including glass, metals, ceramics, plastics, polymers and other hard, non-porous surface types.

The present invention extends to the method of manufacturing the formulations described herein. Under some circumstances, it is envisaged that some or all of the sugar ester, dialkyl ester, humectant and one or more surfactants of the aqueous composition may form interlinking bonds during the method of production. The sugar ester, dialkyl ester, humectant and one or more surfactants in the aqueous composition are therefore intended both to cover the discrete substances or their combination through covalent or non-covalent bonds.

FIGURES

FIG. 1 shows the mean $\log^{10}$ reduction in biocidal activity under clean conditions for sample 1 containing biocidal active ingredients only and sample 2 containing a formulation of the invention comprising a lower concentration of biocidal active ingredients compared to sample 1 in combination with an aqueous composition.

Figure 2:
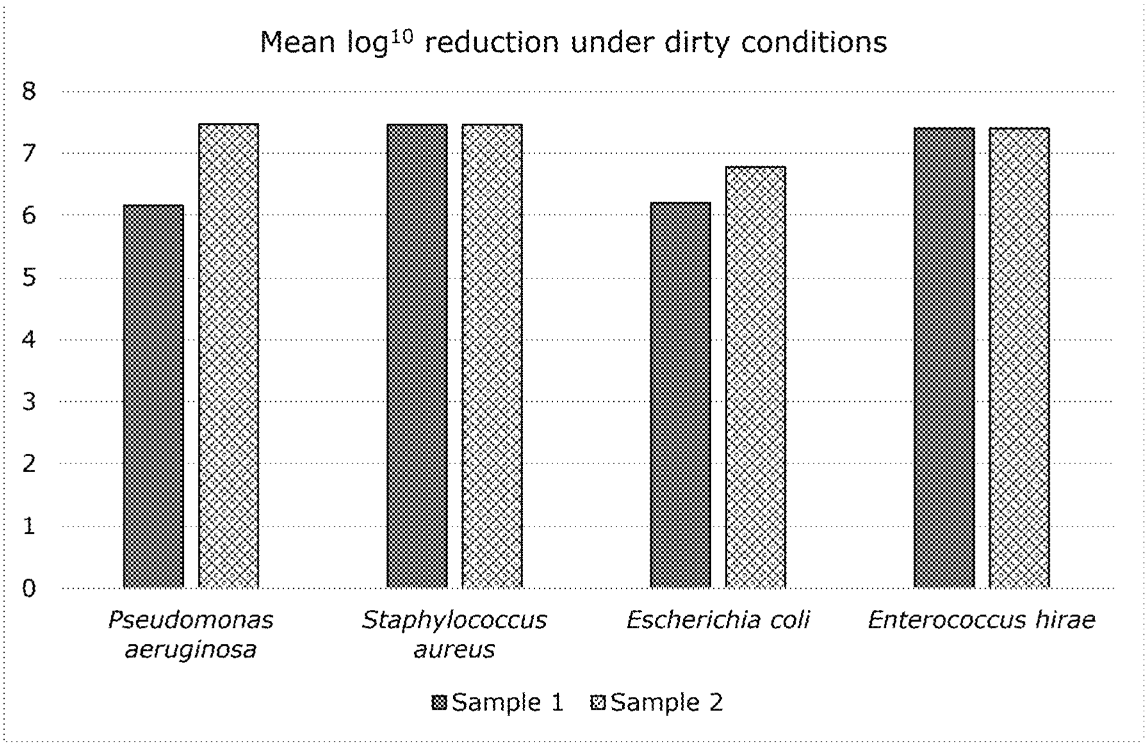

FIG. 2 shows the mean $\log^{10}$ reduction in biocidal activity under dirty conditions for sample 1 containing biocidal active ingredients only and sample 2 containing a formulation of the invention comprising a lower concentration of biocidal active ingredients compared to sample 1 in combination with an aqueous composition.

DETAILED DESCRIPTION OF THE INVENTION

The present invention concerns a formulation comprising at least one active ingredient that has biocidal properties and an aqueous composition which acts to boost the biocidal activity of the active ingredient(s).

The terms "biocide" or "biocidal" are intended to refer to a substance that destroys, deters, renders harmless, prevents the action of or otherwise exerts a controlling effect on harmful, undesired organisms. The term also encompasses more specific terms such as bactericidal, viricidal, fungicidal and germicidal. Typically, a biocidal active ingredient is the substance that has a controlling effect on harmful, undesired organisms. A biocide typically comprises a biocidal active ingredient but may also comprise additional components. Biocides can be synthetic or naturally occurring, for example derived from bacteria or plants.

The term "disinfectant" is intended to refer to a biocidal product used to inactivate or destroy microorganisms, such as bacteria and viruses on inert surfaces. Disinfectants can also be used to destroy microorganisms on the skin and mucous membrane. Disinfectants generally work by destroying the cell wall and/or membrane of microorganisms or by interfering with their metabolism by inducing cell responses such as increased levels of reactive oxygen species, increased stress response and membrane damage.

Examples of biocidal active ingredients that may be included in the formulation described herein include, but are not limited to detergents, abrasives, acids, alkalis, bleaches, enzymes, fragrances, preservatives, dyes, thickeners, foaming agents, gelling agents, quaternary ammonium compounds (for example alkyl dimethyl benzyl ammonium chloride, didecyl dimethyl ammonium chloride, octyl decyl dimethyl ammonium chloride, dioctyl dimethyl ammonium chloride, 3-trimethoxysilylpropyldimethyloctadecyl ammonium chloride), chlorine-releasing agents (for example sodium dichioroisocyanurate, calcium hypochlorite, sodium tosyichloramide and trichloroisocyanuric acid), alcohols (for example ethanol and isopropanol), hydrogen peroxide, peracetic acid and acetic acid.

The amount of the at least one biocidal active ingredient in the formulation will depend on the type of active ingredient selected. The skilled person will be able to adjust the amount of biocidal active ingredient required for the desired use and biocidal activity. In general, the at least one biocidal active ingredient may be present in the formulation in an amount of at least 0.06 wt. % based on the weight of the formulation. The at least one biocidal active ingredient may be present in the formulation in an amount of at least 1 wt. % or at least 5 wt. % based on the weight of the formulation. Alternatively, the at least one biocidal active ingredient may be present in the formulation in an amount of up to 40 wt. % based on the weight of the formulation. The at least one biocidal active ingredient may be present in the formulation in an amount of up to 35 wt. % based on the weight of the formulation, or up to 30 wt. % based on the weight of the formulation, or up to 5 wt. % based on the weight of the formulation, or up to 1.5 wt. % based on the weight of the formulation, or up to 0.5 wt. % based on the weight of the formulation. For example, the at least one biocidal active ingredient may be present in the formulation in an amount of 0.06 wt. % to 40 wt. %, or 1 to 35 wt. %, or 5 to 30 wt. %, 0.06 wt. % to 5 wt. %, 0.06 wt. % to 3 wt. %, 0.06 wt. % to 1.5 wt. %, 0.06 wt. % to 0.5 wt. % based on the weight of the formulation.

The aqueous composition may be present in the formulation in an amount of at least 0.03 wt. % based on the weight of the formulation. Alternatively, the aqueous composition may be present in the formulation in an amount of up to 15 wt. % based on the weight of the formulation. The aqueous composition may be present in the formulation in an amount of up to 10 wt. % based on the weight of the formulation, up to 7 wt. % based on the weight of the formulation, or up to 3 wt. % based on the weight of the formulation, or up to 1 wt. % based on the weight of the formulation. The aqueous composition may be present in the formulation in an amount of 0.03 wt. % to 15 wt. % based on the weight of the formulation, optionally 0.03 wt. % to 10 wt. %, or 0.03 wt. % to 7 wt. %, or preferably 0.03 wt. % to 3 wt. % based on the weight of the formulation.

The skilled person will understand using their common general knowledge that the balance of the formulation will typically be water. The skilled person will be able to determine the specific amount of water required for the formulation i.e., the amount of water will bring the total amount of all of the components in the formulation up to 100 wt. %.

The aqueous composition may comprise a sugar ester, a dialkyl ester, a humectant and one or more surfactants. Optionally the aqueous composition may further comprise a chelating agent and the formulation may further comprise a pH buffer.

The aqueous composition comprises a sugar ester, for example a sucrose ester, fructose ester, lactose ester or glucose ester. The term "sugar ester" refers to a compound derived from the esterification of a sugar and a fatty acid. As such a sugar ester contains an ester group (RCOOR') formed between an organic acid ($RCO_2H$) and an alcohol (R'OH). Sugar esters are often biodegradable and have good stabilizing properties especially when incorporated into colloidal systems or emulsions. Preferably, the sugar ester is a sucrose ester such as sucrose stearate, sucrose distearate, sucrose dilaurate, sucrose palmitate or combinations thereof. Preferably the sugar ester is sucrose stearate or sucrose distearate, which are commercially available derivatives of stearic acid. The sugar ester may be present in an amount of 1 to 45 wt. % based on the weight of the aqueous composition, preferably 2 to 35 wt. %, 3 to 25 wt. % or 4 to 15 wt. % based on the weight of the aqueous composition.

Throughout this document, the disclosure of a compositional range (e.g. weight range) of a genus also directly and unambiguously applies to each sub-genus and each individual member of the genus. For example, the sugar ester is optionally present in a total amount of 1 to 45 wt. % based on the weight of the aqueous composition, preferably 2 to 35 wt. %, 3 to 25 wt. % or 4 to 15 wt. % based on the weight of the aqueous composition. Preferred sugar esters include sucrose esters such as sucrose stearate or sucrose distearate.

Therefore, the reader should directly and unambiguously understand that the weight ranges also disclose sucrose esters in a total amount of 1 to 45 wt. % 2 to 35 wt. %, 3 to 25 wt. % or 4 to 15 wt. % based on the weight of the aqueous composition. The reader should directly and unambiguously understand that the weight ranges also disclose sucrose stearate or sucrose distearate in an amount of 1 to 45 wt. % 2 to 35 wt. %, 3 to 25 wt. % or 4 to 15 wt. % based on the weight of the aqueous composition.

The aqueous composition comprises a dialkyl ester of an acid selected from succinic acid, carbonic acid, glutaric acid or adipic acid. The term "dialkyl ester" refers to a compound derived from the esterification of a carboxylic acid with an alkyl alcohol. As such a dialkyl ester contains an ester group (RCOOR') formed between a carboxylic acid ($RCO_2H$), preferably an organic carboxylic acid and an alkyl alcohol (R'OH). Preferably dialkyl refers to dimethyl, diethyl, dipropyl, dibutyl or a mixture of methyl, ethyl, propyl or butyl groups such as methylethyl. Preferably, the dialkyl ester is dimethyl succinate, dimethyl carbonate, dimethyl glutarate or dimethyl adipate. Most preferably the dialkyl ester is dimethyl succinate. The dialkyl ester may be present in an amount of 1 to 45 wt. % based on the weight of the aqueous composition, preferably 2 to 35 wt. %, 3 to 25 wt. % or 4 to 15 wt. % based on the weight of the aqueous composition.

The aqueous composition comprises a humectant. A humectant is a hygroscopic (water-absorbing) compound often used to attract and/or retain moisture. Humectants may also be used to increase the solubility of other ingredients in a composition. As such, the humectant aids the blending of the components in the aqueous composition. Preferably the humectant is an alkyl polyol or combination of alkyl polyols, wherein the term polyol is intended to refer to a compound containing two or more hydroxyl (—OH) groups. The alkyl polyol may be an alkyl diol such as propylene glycol, butylene glycol or hexylene glycol. The alkyl polyol may be an alkyl triol such as glycerol (also referred to as glycerine or glycerin in the art) or an alkyl polyol such as sorbitol or xylitol. Preferably the alkyl polyol is glycerol. The humectant is present in an amount of 1 to 40 wt. % based on the weight of the aqueous composition, preferably 2 to 30 wt. %, 4 to 20 wt. % or 6 to 15 wt. % based on the weight of the aqueous composition.

The aqueous composition comprises one or more surfactants. Surfactants, also known as surface active agents, are chemical compounds that decrease the surface tension or interfacial tension between two liquids, a liquid and a gas, or a liquid and a solid. These suspensions help to stabilise the colloid or suspension. The one or more surfactants are present in an amount of 2 to 45 wt. % based on the weight of the aqueous composition, preferably 4 to 35 wt. %, 7 to 25 wt. % or 10 to 15 wt. % based on the weight of the aqueous composition. The one or more surfactants may comprise sugar-derived surfactants, for example the one or more surfactants may comprise a glycoside or combination of glycosides. Glycosides refer to compounds which contain a sugar molecule bound to another molecule via a glycosidic bond. A glycosidic bond is often formed between a hemiacetal or hemiketal group of a sugar molecule (or saccharide) and the hydroxyl group of another molecule such as an alcohol. Sugar esters are therefore excluded from this definition and the skilled person will understand that the one or more surfactants do not include sugar esters or dialkyl esters. Glycosides may include for example include glucosides, fructosides, sucrosides or lactosides. Preferably, the one or more surfactants comprise a glucoside such as an alkylglucoside or an alkylpolyglucoside. For example, the surfactant may comprise capryl glucoside, lauryl glucoside, coco glucoside or combinations thereof. Glucosides are preferred because glucose-derived substances are easily taken up or absorbed and metabolised by bacteria. Glucosides are also biodegradable. It is envisaged that glucoside-based surfactants attract microorganisms towards the formulation due to the sugar component of the compounds, leading to interaction of the microorganisms with the biocidal active ingredient(s) and subsequent eradication.

For all sugar-based components of the aqueous composition (for example, sugar esters and sugar-derived surfactants) it is intended both to cover the discrete D and L forms of the sugars separately as well as the combination or mixture of the D and L forms of the sugars. The D and L forms of a sugar are non-superimposable mirror images of each other. The skilled person will be able to select a suitable method to separate D- and L-isomers if required, such as crystallisation, use of chiral porous materials, membrane resolution methods, enantioselective liquid-liquid extraction, chromatography (for example high-performance liquid chromatography, gas chromatography or supercritical fluid chromatography), or chemical or enzymatic methods (for example kinetic resolution, classical chemical resolution or cocrystal-based resolution).

The aqueous composition may comprise one or more chelating agents. The term "chelating agent" is intended to take its usual meaning in the art of a chemical compound that binds to metal ions. The one or more chelating agents may be present in an amount of 0.25 to 10 wt. % based on the weight of the aqueous composition, preferably 0.5 to 8 wt. %, 0.75 to 6 wt. % or 1 to 4 wt. % based on the weight of the aqueous composition. The one or more chelating agents may comprise commercially available chelators such as, but not limited to tetrasodium N,N-bis(carboxymethyl)-L-glutamate (GLDA), ethylenediaminetetraacetic acid (EDTA), citric acid or ethylenediamine-N,N'-disuccinic acid (EDDS). Tetrasodium N,N-bis(carboxymethyl)-L-glutamate (GLDA) is a preferred chelating agent because it is biodegradable and is based on based upon L-glutamic acid which is a natural and renewable raw material.

It is envisaged that including a chelating agent in the aqueous composition removes ions that could interfere with the biocidal activity of the formulation.

The skilled person will understand that the one or more chelating agents do not include a sugar esters, dialkyl esters or glycosides.

In addition to the components described above, the aqueous composition comprises an aqueous component.

The aqueous component of the aqueous composition forms the continuous phase in which other substances are dispersed and/or suspended. A sufficient amount of water is present to form the continuous phase; The water content is optionally 20 to 90 wt. % based on the weight of the aqueous composition. The skilled person will be able to determine the specific amount of water required as water is the balance for the aqueous composition i.e., the amount of water will bring the total amount of all of the components in the aqueous composition to 100 wt. %. The water typically has a pH of 6-8, 6.5-7.5 or 7 and can fresh water, tap water, deionised or purified water.

The aqueous composition may be a colloid or a suspension, and in each instance the aqueous component forming the continuous phase of the aqueous composition is water.

The aqueous composition of the formulation may be in the form of a colloid or a suspension. A colloid is a homogeneous non-crystalline substance consisting of large molecules or ultramicroscopic particles of one substance dispersed through a second substance. Colloids include gels, sols, and emulsions; the particles do not settle, and cannot be separated out by ordinary filtering or centrifuging like those in a suspension. A suspension is a composition in which solid particles are dispersed in a continuous liquid phase.

The structure of the colloid can be examined by light-scattering techniques that are familiar to a person operating in this technical field. For example, dynamic light scattering can be used to detect the size of a colloidal particle by measuring how fast they diffuse. This method involves directing laser light towards a colloid. The scattered light will form an interference pattern, and the fluctuation in light intensity in this pattern is caused by the Brownian motion of the particles. If the apparent size of the particles increases due to them clumping together via aggregation, it will result in slower Brownian motion. This technique can confirm that aggregation has occurred if the apparent particle size is determined to be beyond the typical size range for colloidal particles. For example, many aqueous compositions of the present disclosure are oil in water emulsions.

The structure of the suspension can be examined by light-scattering techniques that are familiar to a person operating in this technical field. For example, as with colloids, suspended particle size can be assessed using dynamic light scattering to determine mean particle size and size distribution, for example.

The formulation may have a pH in the range of 6-8, preferably 6.5-7.5 or 7. An advantage of having a pH at or around neutral is that the formulations can be used on any type of surface without damaging them. The formulations are also safer to use and so personal protective equipment which is often required for compositions with a very high or very low pH such as peroxides, bleaches or sodium hydroxide, is not needed. Despite the less harmful and less toxic nature of the formulations of the present invention, the formulations are surprisingly as effective, and in some cases more effective at reducing microorganism populations as formulations containing higher concentrations of biocidal active ingredients in the absence of the aqueous composition.

The skilled person may adjust the pH of the formulation by adding a pH buffer. The pH buffer may be present in amount of 0.025 to 2 wt. %, preferably 0.05 to 1 wt. %, 0.075 to 0.75 wt. % or 0.1 to 0.5 wt. % based on the weight of the formulation. Any suitable pH buffer may be included and the skilled person will be able to select a suitable one. Preferred pH buffers include citric acid, acetic acid, carbonic acid, sodium hydroxide, Tris, HEPES or monopotassium phosphate. Most preferably, the buffer is citric acid or sodium hydroxide. When citric acid is used as a chelating agent, an alternative pH buffer may be required. If citric acid is used as a chelating agent and pH buffer the skilled person will be able to adjust the preferred amounts of these components accordingly.

Optionally, the formulation may further comprise one or more additives such as fragrances, preservatives, plasticisers, soaps, detergents, abrasives, solvents, builders, enzymes, oxidisers, acids, alkalis, bleaches, reducing agents, foaming agents, gelling agents, dyes, colouring agents, thickeners, emulsifiers, rinse aids, viscosity modifiers, polymers, allergy inhibitors and film forming agents.

The present invention concerns use of the formulations as biocidal agents in wide variety of applications. For example, the formulation may be used on surfaces and equipment in transport facilities such as airports, bus stations, train stations, shipping terminals, service stations as well as in vehicles such as cars, trucks, trains, trailers, boats, ships, tanks, buses, airplanes and helicopters.

The formulation may also be used on surfaces and equipment in emergency service buildings and vehicles such as fire stations and fire engines, police vehicles, police stations and prisons as well as courts and crime scenes, hospitals, medical and dental offices and clinics, healthcare facilities, operating rooms/theatres and autopsy rooms. This includes for example tools, surgical equipment, protective clothing, bedding and scanners.

The formulation may also be used on surfaces and equipment in educational or care facilities such as day care centres, nurseries, schools and colleges as well as nursing homes, funeral homes and cadaver processing areas.

The formulation may be used on surfaces and equipment in animal care or processing facilities such as veterinary clinics, animal laboratories, animal research centres, animal quarantine areas, animal holding areas, farms, kennels, animal breeding facilities, breeding establishments, animal husbandry establishments, grooming establishments, animal housing facilities, zoos, tack shops, pet shops, meat and poultry plants and hatcheries.

The formulation may also be on surfaces and equipment used in recreational facilities such as gyms, playgrounds, campgrounds, hotels, libraries, museums, theatres, cinemas, bowling alleys, sports arenas and concert venues.

The formulation may be used on surfaces and equipment in public facilities such as recycling centres, banks, churches and post offices.

The formulation may be used on surfaces and equipment in facilities that prepare, store or serve food such as restaurants, bars, kitchens, bakeries, dairies, butchers, canneries, beverage plants, fermentation tanks and facilities, supermarkets, wholesale establishments, food storage areas, food handling and processing areas as well as kitchen equipment including refrigerators, ovens, ice machines and utensils.

The formulation may be used on surfaces and equipment in residential, commercial and public bathrooms or washrooms including on toilets, sinks, showers, baths and changing facilities.

The formulation may be used on surfaces and equipment in manufacturing facilities and laboratories such as cosmetic, medical device, biotechnology, computer and pharmaceutical facilities as well as in retail, storage and distribution facilities.

The formulation may be used in water cooling towers, commercial water circulation systems, irrigation systems, water heating and cooling systems, water purification systems, reverse osmosis systems, filtration systems, sanitisation systems, condensers, evaporators and pasteurizers.

The formulation may be used in agricultural facilities such as for treatment of meat, seafood, poultry, fruit and vegetable, nut processing plants, in tobacco plant premises, for disease control on fruits and vegetables, treatment of fruit and vegetable processing waters, in humidification water for post-harvest crops in storage, greenhouses, foliar sprays, cut flowers, and for treatment of roots, turf, seed beds and soil.

The formulation may be used aqueous treatment fluids in subterranean oilfield and gas-field well operations such as well drilling, formation fracturing, productivity enhancement and secondary recovery, drilling muds, fracturing fluids, well squeezed fluids, flooding, injection and produced water and pipeline and tank maintenance.

Use of the formulations as a biocidal agents can also include application to a variety of surfaces, for example glass surfaces, metal surfaces, plastic surfaces, laminated surfaces, glazed surfaces, ceramic surfaces, stone surfaces, wooden surfaces upholstery, wallpaper, painted surfaces, countertops, stovetops, bathroom surfaces, kitchen surfaces, food, meat, crops, hard, non-porous surfaces, fabric, conductive surfaces, rubber surfaces and leather surfaces.

The present invention concerns a method of manufacturing the formulations described herein.

The process by which the aqueous compositions of the formulations are manufactured allows components that are often difficult to combine to be blended into a colloid or suspension without compounds falling out of solution.

Under some circumstances, it is envisaged that some or all of the sugar ester, dialkyl ester, humectant and one or more surfactants may form interlinking bonds during the method of production. The sugar ester, dialkyl ester, humectant and one or more surfactants in the aqueous composition are therefore intended both to cover the discrete substances or their combination through covalent or non-covalent bonds.

The method for manufacturing the formulation described herein comprises the steps of:

(a) forming an aqueous composition by:
   (i) mixing a sugar ester and a dialkyl ester with water,
   (ii) adding one or more surfactants, and
   (iii) adding a humectant; and
(b) mixing at least one biocidal active ingredient with the aqueous composition.

The method may be performed at room temperature. Increasing the temperature the method is performed at may increase the speed at which the components are blended together, for example the method may be performed at any temperature within a range of 25° C. to 65° C., optionally 35° C. to 60° C., optionally 45° C. to 55° C. or 50° C.

In steps (i), (ii) and (iii) of the method described above, the components may be mixed together by stirring at a speed of at least 200 rpm. Electromechanical stirring may be used but the method of stirring is not particularly limited.

In step (i), the sugar ester is added in an amount of 1 to 45 wt. % based on the weight of the aqueous composition, preferably 2 to 35 wt. %, 3 to 25 wt. % or 4 to 15 wt. % based on the weight of the aqueous composition. The sugar ester may comprise a sucrose ester, fructose ester, lactose ester or glucose ester. Preferably the sugar ester is a sucrose ester such as sucrose stearate, sucrose distearate, sucrose dilaurate, sucrose palmitate or combinations thereof. Preferably the sugar ester is sucrose stearate or sucrose distearate, which are commercially available derivatives of stearic acid. The dialkyl ester is added in an amount of 1 to 45 wt. % based on the weight of the aqueous composition, preferably 2 to 35 wt. %, 3 to 25 wt. % or 4 to 15 wt. % based on the weight of the aqueous composition. The dialkyl ester may comprise dialkyl ester of an acid selected from succinic acid, carbonic acid, glutaric acid or adipic acid. Preferably dialkyl refers to dimethyl, diethyl, dipropyl, dibutyl or a mixture of methyl, ethyl, propyl or butyl groups such as methylethyl. Preferably, the dialkyl ester is dimethyl succinate, dimethyl carbonate, dimethyl glutarate or dimethyl adipate. Most preferably the dialkyl ester is dimethyl succinate. The amount of water is 20 to 90 wt. % based on the weight of the aqueous composition. The amount of water provides the balance for the aqueous composition.

In step (ii), one or more surfactants are added in an amount of 2 to 45 wt. % based on the weight of the aqueous composition, preferably 4 to 35 wt. %, 7 to 25 wt. % or 10 to 15 wt. % based on the weight of the aqueous composition. The one or more surfactants may comprise sugar-derived surfactants, for example the one or more surfactants may comprise a glycoside or combination of glycosides. Glycosides may include for example include glucosides, fructosides, sucrosides or lactosides. Preferably, the one or more surfactants comprise a glucoside such as an alkylglucoside or an alkylpolyglucoside. For example, the surfactant may comprise capryl glucoside, lauryl glucoside, coco glucoside or combinations thereof.

In step (iii) a humectant is added in an amount of 1 to 40 wt. % based on the weight of the aqueous composition, preferably 2 to 30 wt. %, 4 to 20 wt. % or 6 to 15 wt. % based on the weight of the aqueous composition. Preferably the humectant is an alkyl polyol or combination of alkyl polyols. The alkyl polyol may be an alkyl diol such as propylene glycol, butylene glycol or hexylene glycol. The alkyl polyol may be an alkyl triol such as glycerol (also referred to as glycerine or glycerin in the art) or an alkyl polyol such as sorbitol or xylitol. Preferably the alkyl polyol is glycerol.

One or more chelating agents may be added to the mixture in step (i) in an amount of 0.25 to 10 wt. % based on the weight of the aqueous composition, preferably 0.5 to 8 wt. %, 0.75 to 6 wt. % or 1 to 4 wt. % based on the weight of the aqueous composition. The one or more chelating agents may comprise tetrasodium N,N-bis(carboxymethyl)-L-glutamate (GLDA), ethylenediaminetetraacetic acid (EDTA), ethylenediamine-N,N'-disuccinic acid (EDDS) or citric acid or combinations thereof. Preferably the chelating agent is tetrasodium N,N-bis(carboxymethyl)-L-glutamate (GLDA).

The skilled person will understand using their common general knowledge that the balance of the formulation will typically be water. The skilled person will be able to determine the specific amount of water required for the formulation i.e., the amount of water will bring the total amount of all of the components in the formulation up to 100 wt. %. As such, the method may comprise a further step of adding the aqueous composition and at least one biocidal active ingredient mixture to water.

The pH of the formulation is preferably in the range of 6-8, preferably 6.5-7.5 or 7. Accordingly it may be necessary to add a pH buffer to the mixture until the pH of the formulation is at a desirable value. The pH buffer may comprise citric acid, but the skilled person will be able to select any suitable buffer to adjust the pH of the formulation. The pH buffer may be present in amount of 0.025 to 2 wt. % based on the weight of the formulation, preferably 0.05 to 1 wt. %, 0.075 to 0.75 wt. % or 0.1 to 0.5 wt. % based on the weight of the formulation.

EXAMPLES

The present invention can be further understood by reference to the following non-limiting Examples.

Example 1: Example Preparation of Formulation

A tank containing water was heated to 50° C. and sucrose distearate, dimethyl succinate and GLDA were added whilst stirring. The temperature was reduced to 40° C. and glucosides were added. Glycerol was then added to the mixture which was allowed to cool to room temperature. The resulting aqueous composition was mixed with a biocidal active ingredient. The pH of the resulting formulation was adjusted to pH 7 using citric acid.

The skilled person will be able to dilute the formulation as required depending on the desired final concentration of aqueous composition and biocidal active ingredient.

Further aqueous compositions were prepared in accordance with the method above with components in the amounts provided in table 1 below.

TABLE 1

| Component | Amount |
|---|---|
| Water | Balance |
| Sucrose distearate | 4-15% |
| Dimethyl succinate | 4-15% |
| Glycerine | 10-15% |
| Citric acid | 0.1-0.5% |
| Capryl glucoside | 2-5% |
| Lauryl glucoside | 2-5% |
| Coco glucoside | 2-5% |
| GLDA | 1-4% |

Example 2: Evaluation of Bactericidal Activity

Quantitative suspension tests were performed in accordance with EN 1276 to establish the biocidal activity (e.g., bactericidal) within a liquid suspension under simulated practical conditions appropriate for use in food, industrial, domestic and institutional areas.

Test Procedure

TABLE 2

| | |
|---|---|
| Sample 1 | 1320 ppm dodecyl dimethyl ammonium chloride in standard hard water (standard hard water calculated as containing 400 ppm $CaCO_3$)<br>1320 ppm n-alkyl dimethyl benzyl ammonium in standard hard water |
| Sample 2 | 330 ppm dodecyl dimethyl ammonium in standard hard water (standard hard water calculated as containing 400 ppm $CaCO_3$)<br>330 ppm n-alkyl dimethyl benzyl ammonium chloride in standard hard water<br>100 ppm aqueous composition of the invention |

TABLE 2-continued

| | |
|---|---|
| Test bacteria | *Staphylococcus aureus* (NCTC 10788)<br>*Pseudomonas aeruginosa* (NCTC 6749)<br>*Escherichia coli* (NCTC 10538)<br>*Enterococcus hirae* (NCTC 12367) |
| Neutralizer fluid | Tween 80 (30 g/l)<br>Sodium lauryl sulphate (4 g/l)<br>Lecithin (3 g/l) |
| Interfering substance | Bovine serum albumin (BSA)<br>0.3% BSA concentration (clean conditions)<br>3% BSA concentration (dirty conditions) |
| Contact time | 1 minute |
| Test temperature | 20° C. |
| Inhibition method | Dilution/neutralization |
| Appearance product dilution | Clear solution |

1 ml of the test bacteria was mixed with 1 ml of interfering substance (0.3% or 3% bovine serum albumin). The prepared test sample was added to the mixture (see table 2 for details). After a contact time of 1 minute, 1 ml of the mixture was removed and added to 9 ml of a neutralizer fluid (see table 2 for details). After a period of 1 minute of neutralization, 1 ml of the neutralized mixture is plated to detect surviving test bacteria. All tests were carried out in duplicate.

Test Results

The results of the testing are displayed in the tables 3 and 4 below and also in FIGS. 1 and 2.

TABLE 3

| Sample 1 | | | | | | | | |
|---|---|---|---|---|---|---|---|---|
| | | | Log$^{10}$ reduction achieved | | | | | |
| | | | Clean conditions (0.3% BSA) Test | | | Dirty conditions (3% BSA) Test | | |
| Test organism | Log$^{10}$ Initial count | Contact time | 1 | 2 | Mean | 1 | 2 | Mean |
| *Pseudomonas aeruginosa* | 8.47 | 1 min | >6.16 | >6.16 | >6.16 | >6.16 | >6.16 | >6.16 |
| *Staphylococcus aureus* | 8.46 | 1 min | >7.46 | >7.46 | >7.46 | >7.46 | >7.46 | >7.46 |
| *Escherichia coli* | 7.78 | 1 min | >6.20 | >6.20 | >6.20 | >6.20 | >6.20 | >6.20 |
| *Enterococcus hirae* | 8.40 | 1 min | >7.40 | >7.40 | >7.40 | >7.40 | >7.40 | >7.40 |

TABLE 4

| Sample 2 | | | | | | | | |
|---|---|---|---|---|---|---|---|---|
| | | | $Log^{10}$ reduction achieved | | | | | |
| | | | Clean conditions (0.3% BSA) Test | | | Dirty conditions (3% BSA) Test | | |
| Test organism | $Log^{10}$ Initial count | Contact time | 1 | 2 | Mean | 1 | 2 | Mean |
| *Pseudomonas aeruginosa* | 8.47 | 1 min | >7.47 | >7.47 | >7.47 | >7.47 | >7.47 | >7.47 |
| *Staphylococcus aureus* | 8.46 | 1 min | >7.46 | >7.46 | >7.46 | >7.46 | >7.46 | >7.46 |
| *Escherichia coli* | 7.78 | 1 min | >6.78 | >6.78 | >6.78 | >6.78 | >6.78 | >6.78 |
| *Enterococcus hirae* | 8.40 | 1 min | >7.40 | >7.40 | >7.40 | >7.40 | >7.40 | >7.40 |

The tests were carried out under clean and dirty conditions. The term "clean conditions" is intended to refer to a concentration of 0.3% bovine serum albumin, in accordance with the European Standard. The term "dirty conditions" is intended to refer to a concentration of 3% bovine serum albumin, in accordance with the European Standard. The use of bovine serum albumin as an interfering substance emulates organic soiling and is therefore used to test the efficacy of cleaning products and disinfectants.

As shown above, sample 1 contains biocidal active ingredients commonly contained in disinfectant formulations (dodecyl dimethyl ammonium chloride and n-alkyl dimethyl benzyl ammonium chloride). Sample 1 contains a higher concentration (75% v/v higher) of the biocidal actives than sample 2. Sample 2 also contains the aqueous composition described herein.

When tested in accordance with EN 1276, both samples passed the test criteria. Compliance with the test criteria was achieved with 1 minute under clean and dirty conditions.

Both samples achieved a reduction of $>5^{Log10}$ with all 4 test organisms under clean and dirty conditions within the test times.

The results demonstrate that sample 2 was equally if not more effective at killing bacteria due to the presence of the aqueous composition of the invention despite containing 75% v/v less active than sample 1. As such, including the aqueous composition enables a lower concentration of biocidal actives to be used without compromising biocidal (e.g. bactericidal) efficacy. In some cases, combining the aqueous composition with a lower concentration of biocidal actives boosts the biocidal efficacy of the sample beyond the biocidal efficacy achieved with a higher concentration of biocidal actives in the absence of the aqueous composition.

Example 3: Evaluation of Bactericidal Activity

Quantitative suspension tests are performed to establish the biocidal activity of the compositions of table 1.

Test Procedure

TABLE 5

| | |
|---|---|
| Sample 3 | 330 ppm dodecyl dimethyl ammonium in standard hard water (standard hard water calculated as containing 400 ppm $CaCO_3$)<br>330 ppm n-alkyl dimethyl benzyl ammonium chloride in standard hard water<br>300 ppm an aqueous composition according to table 1 |

TABLE 5-continued

| | |
|---|---|
| Test bacteria | *Staphylococcus aureus* (NCTC 10788)<br>*Pseudomonas aeruginosa* (NCTC 6749)<br>*Escherichia coli* (NCTC 10538)<br>*Enterococcus hirae* (NCTC 12367) |
| Neutralizer fluid | Tween 80 (30 g/l)<br>Sodium lauryl sulphate (4 g/l)<br>Lecithin (3 g/l) |
| Interfering substance | Bovine serum albumin (BSA)<br>0.3% BSA concentration (clean conditions)<br>3% BSA concentration (dirty conditions) |
| Contact time | 1 minute |
| Test temperature | 20° C. |
| Inhibition method | Dilution/neutralization |
| Appearance product dilution | Clear solution |

1 ml of the test bacteria is mixed with 1 ml of interfering substance (0.3% or 3% bovine serum albumin). The prepared test sample is added to the mixture (see table 5 for details). After a contact time of 1 minute, 1 ml of the mixture is removed and added to 9 ml of a neutralizer fluid (see table 5 for details). After a period of 1 minute of neutralization, 1 ml of the neutralized mixture is plated to detect surviving test bacteria. All tests are carried out in duplicate.

Test Results

The results of the testing are displayed in the table 6.

TABLE 6

| Sample 3 | | | |
|---|---|---|---|
| | | $Log^{10}$ reduction achieved | |
| Test organism | Contact time | Clean conditions (0.3% BSA) Test Mean | Dirty conditions (3% BSA) Test Mean |
| *Pseudomonas aeruginosa* | 1 min | $>5^{Log10}$ | $>5^{Log10}$ |
| *Staphylococcus aureus* | 1 min | $>5^{Log10}$ | $>5^{Log10}$ |
| *Escherichia coli* | 1 min | $>5^{Log10}$ | $>5^{Log10}$ |
| *Enterococcus hirae* | 1 min | $>5^{Log10}$ | $>5^{Log10}$ |

The tests are carried out under clean and dirty conditions. The term "clean conditions" is intended to refer to a concentration of 0.3% bovine serum albumin, in accordance with the European Standard. The term "dirty conditions" is intended to refer to a concentration of 3% bovine serum albumin, in accordance with the European Standard. The use of bovine serum albumin as an interfering substance emulates organic soiling and is therefore used to test the efficacy of cleaning products and disinfectants.

Sample 3 passes the test criteria. Compliance with the test criteria is achieved with 1 minute under clean and dirty conditions.

Formulations achieve a mean reduction of >$5^{Log10}$ with all 4 test organisms under clean and dirty conditions within the test times.

The results demonstrate that formulations prepared according to the invention are equally if not more effective at killing bacteria due to the presence of the aqueous composition of the invention despite containing 75% v/v less active than sample 1. As such, including the aqueous composition enables a lower concentration of biocidal actives to be used without compromising biocidal (e.g. bactericidal) efficacy. In some cases, combining the aqueous composition with a lower concentration of biocidal actives boosts the biocidal efficacy of the sample beyond the biocidal efficacy achieved with a higher concentration of biocidal actives in the absence of the aqueous composition.

It would be appreciated that the process and components of the invention are capable of being implemented in a variety of ways, only a few of which have been illustrated and described above.

Paragraphs

Paragraph 1: A formulation comprising at least one biocidal active ingredient and an aqueous composition, wherein the aqueous composition comprises:

(a) a sugar ester;

(b) a dialkyl ester;

(c) a humectant; and (d) one or more surfactants, wherein the aqueous composition is a colloid or a suspension.

Paragraph 2: The formulation of paragraph 1, wherein the sugar ester is a sucrose ester, fructose ester, lactose ester or glucose ester, preferably wherein the sugar ester is a sucrose ester, optionally sucrose stearate or sucrose distearate and is optionally present in an amount of 1 to 45 wt. % based on the weight of the aqueous composition, preferably 2 to 35 wt. %, 3 to 25 wt. % or 4 to 15 wt. % based on the weight of the aqueous composition.

Paragraph 3: The formulation of any preceding paragraph, wherein the sugar ester is sucrose stearate and is present in an amount of 1 to 45 wt. % based on the weight of the aqueous composition, preferably 2 to 35 wt. %, 3 to 25 wt. % or 4 to 15 wt. % based on the weight of the aqueous composition.

Paragraph 4: The formulation of any preceding paragraph, wherein the sugar ester is sucrose distearate and is present in an amount of 1 to 45 wt. % based on the weight of the aqueous composition, preferably 2 to 35 wt. %, 3 to 25 wt. % or 4 to 15 wt. % based on the weight of the aqueous composition.

Paragraph 5: The formulation of any preceding paragraph, wherein the sugar ester is sucrose distearate and is present in an amount of 4 to 15 wt. % based on the weight of the aqueous composition.

Paragraph 6: The formulation of any preceding paragraph, wherein the sugar ester is derived from esterification of a sugar and a fatty acid.

Paragraph 7: The formulation of any preceding paragraph, wherein the dialkyl ester is a dialkyl ester of an acid selected from succinic acid, carbonic acid, glutaric acid or adipic acid, preferably the dialkyl ester is dimethyl succinate, dimethyl carbonate, dimethyl glutarate or dimethyl adipate, more preferably dimethyl succinate and is optionally present in an amount of 1 to 45 wt. % based on the weight of the aqueous composition, preferably 2 to 35 wt. %, 3 to 25 wt. % or 4 to 15 wt. % based on the weight of the aqueous composition.

Paragraph 8: The formulation of any preceding paragraph, wherein the dialkyl ester is dimethyl succinate, and is optionally present in an amount of 1 to 45 wt. % based on the weight of the aqueous composition, preferably 2 to 35 wt. %, 3 to 25 wt. % or 4 to 15 wt. % based on the weight of the aqueous composition.

Paragraph 9: The formulation of any preceding paragraph, wherein the dialkyl ester is dimethyl succinate, and is present in an amount 4 to 15 wt. % based on the weight of the aqueous composition.

Paragraph 10: The formulation of any preceding paragraph, wherein the dialkyl ester is derived from esterification of a carboxylic acid and an alkyl alcohol.

Paragraph 11: The formulation of any preceding paragraph, wherein the dialkyl ester is not a sugar ester.

Paragraph 12: The formulation of any preceding paragraph, wherein the humectant is an alkyl polyol or combination of alkyl polyols, preferably an alkyl diol, optionally propylene glycol, butylene glycol or hexylene glycol, or an alkyl trioi, optionally glycerol, or an alkyl polyol optionally sorbitol or xylitol, preferably the alkyl polyol is glycerol, and is optionally present in an amount of 1 to 40 wt. % based on the weight of the aqueous composition, preferably 2 to 30 wt. %, 4 to 20 wt. % or 6 to 15 wt. %, based on the weight of the aqueous composition.

Paragraph 13: The formulation of any preceding paragraph, wherein the humectant is glycerol and is present in an amount of 6 to 15 wt. %, based on the weight of the aqueous composition.

Paragraph 14: The formulation of any preceding paragraph, wherein the one or more surfactants comprise a glycoside or combination of glycosides.

Paragraph 15: The formulation of any preceding paragraph, wherein the one or more surfactants comprise one or more glucosides, preferably wherein the glucosides are selected from one or more of capryl glucoside, lauryl glucoside and coco glucoside, optionally wherein the one or more surfactants are present in an amount of 2 to 45 wt. % based on the weight of the aqueous composition, preferably 4 to 35 wt. %, 7 to 25 wt. % or 10 to 15 wt. %, based on the weight of the aqueous composition.

Paragraph 16: The formulation of any preceding paragraph, wherein the one or more surfactants comprise one or more of capryl glucoside, lauryl glucoside and coco glucoside, and are present in an amount 10 to 15 wt. %, based on the weight of the aqueous composition.

Paragraph 17: The formulation of any preceding paragraph, wherein the one or more surfactants do not include sugar esters or dialkyl esters.

Paragraph 18: The formulation of any preceding paragraph, wherein the at least one biocidal active ingredient is a substance that destroys, deters, renders harmless, prevents the action of or otherwise exerts a controlling effect on harmful, undesired organisms.

Paragraph 19: The formulation of any preceding paragraph, wherein the at least one biocidal active ingredient is selected from: detergents, abrasives, acids, alkalis, bleaches, enzymes, fragrances, preservatives, dyes, thickeners, foaming agents, gelling agents, quaternary ammonium compounds (for example alkyl dimethyl benzyl ammonium chloride, didecyl dimethyl ammonium chloride, octyl decyl dimethyl ammonium chloride, dioctyl dimethyl ammonium chloride, 3-trimethoxysilylpropyldimethyloctadecyl ammonium chloride), chlorine-releasing agents (for example sodium dichloroisocyanurate, calcium hypochlorite, sodium tosylchloramide and trichloroisocyanuric acid), alcohols (for example ethanol and isopropanol), hydrogen peroxide, peracetic acid and acetic acid.

Paragraph 20: The formulation of any preceding paragraph, wherein the formulation achieves a mean reduction of $>5^{Log10}$ in viable bacteria within 5 minutes.

Paragraph 21: The formulation of any preceding paragraph, wherein the formulation achieves a mean reduction of $>5^{Log10}$ in viable bacteria within 1 minute.

Paragraph 22: The formulation of any preceding paragraph, wherein the formulation achieves a mean reduction of $>6^{Log10}$ in viable bacteria within 5 minutes.

Paragraph 23: The formulation of any preceding paragraph, wherein the formulation achieves a mean reduction of $>6^{Log10}$ in viable bacteria within 1 minute.

Paragraph 24: The formulation of any of paragraphs 20 to 23, wherein the viable bacteria is at least one of *Pseudomonas aeruginosa, Staphylococcus aureus, Escherichia coli*, and *Enterococcus* hirae.

Paragraph 25: A formulation comprising at least one biocidal active ingredient and an aqueous composition, wherein the aqueous composition comprises:

(a) a sucrose ester;
(b) dimethyl succinate;
(c) a humectant; and
(d) one or more surfactants, wherein the aqueous composition is a colloid or a suspension.

Paragraph 26: A formulation comprising at least one biocidal active ingredient and an aqueous composition, wherein the aqueous composition comprises:

(a) sucrose distearate;
(b) dimethyl succinate;
(c) a humectant; and
(d) one or more surfactants, wherein the aqueous composition is a colloid or a suspension.

Paragraph 27: A formulation comprising at least one biocidal active ingredient and an aqueous composition, wherein the aqueous composition comprises:

(a) sucrose distearate;
(b) dimethyl succinate;
(c) glycerol; and
(d) one or more surfactants, wherein the aqueous composition is a colloid or a suspension.

Paragraph 28: A formulation comprising at least one biocidal active ingredient and an aqueous composition, wherein the aqueous composition comprises:

(a) sucrose distearate;
(b) dimethyl succinate;
(c) glycerol; and
(d) one or more of capryl glucoside, lauryl glucoside and coco glucoside, wherein the aqueous composition is a colloid or a suspension.

Paragraph 29: A formulation comprising at least one biocidal active ingredient and an aqueous composition, wherein the aqueous composition comprises:

(a) sucrose distearate;
(b) dimethyl succinate;
(c) glycerol; and
(d) one or more of capryl glucoside, lauryl glucoside and coco glucoside, wherein the aqueous composition is a colloid or a suspension, wherein the at least one biocidal active ingredient is present in an amount of at least 0.06% based on the weight of the formulation, and wherein the aqueous composition is present in an amount of at least 0.03% based on the weight of the formulation.

Paragraph 30: A formulation comprising at least one biocidal active ingredient and an aqueous composition, wherein the aqueous composition comprises:

(a) sucrose distearate;
(b) dimethyl succinate;
(c) glycerol; and
(d) one or more of capryl glucoside, lauryl glucoside and coco glucoside, wherein the aqueous composition is a colloid or a suspension, wherein the at least one biocidal active ingredient is present in an amount of at least 0.06% based on the weight of the formulation, and wherein the aqueous composition is present in an amount of 0.03% to 15% based on the weight of the formulation.

Paragraph 31: A formulation comprising at least one biocidal active ingredient and an aqueous composition, wherein the aqueous composition comprises:

(a) sucrose distearate;
(b) dimethyl succinate;
(c) glycerol; and
(d) one or more of capryl glucoside, lauryl glucoside and coco glucoside, wherein the aqueous composition is a colloid or a suspension, wherein the at least one biocidal active ingredient is present in an amount of at least 0.06% based on the weight of the formulation, and wherein the aqueous composition is present in an amount of 0.03% to 3% based on the weight of the formulation.

Paragraph 32: A formulation comprising at least one biocidal active ingredient and an aqueous composition, wherein the aqueous composition comprises:

(a) 4 to 15 wt. % based on the weight of the aqueous composition of a sucrose ester;
(b) 4 to 15 wt. % based on the weight of the aqueous composition of a dialkyl ester;
(c) 6 to 15 wt. % based on the weight of the aqueous composition of a humectant; and
(d) 10 to 15 wt. % based on the weight of the aqueous composition of one or more surfactants, wherein the aqueous composition is a colloid or a suspension.

Paragraph 33: A formulation comprising at least one biocidal active ingredient and an aqueous composition, wherein the aqueous composition comprises:

(a) 4 to 15 wt. % based on the weight of the aqueous composition of sucrose distearate;
(b) 4 to 15 wt. % based on the weight of the aqueous composition of dimethyl succinate;
(c) 6 to 15 wt. % based on the weight of the aqueous composition of glycerol; and
(d) 10 to 15 wt. % based on the weight of the aqueous composition of one or more of capryl glucoside, lauryl glucoside and coco glucoside, wherein the aqueous composition is a colloid or a suspension.

Paragraph 34: A formulation comprising at least one biocidal active ingredient and an aqueous composition, wherein the aqueous composition comprises:

(a) 4 to 15 wt. % based on the weight of the aqueous composition of sucrose distearate;
(b) 4 to 15 wt. % based on the weight of the aqueous composition of dimethyl succinate;
(c) 6 to 15 wt. % based on the weight of the aqueous composition of glycerol; and
(d) 10 to 15 wt. % based on the weight of the aqueous composition of one or more of capryl glucoside, lauryl glucoside and coco glucoside,
wherein the aqueous composition is a colloid or a suspension,
wherein the at least one biocidal active ingredient is present in an amount of at least 0.06% based on the weight of the formulation, and
wherein the aqueous composition is present in an amount of 0.03% to 3% based on the weight of the formulation.

Paragraph 35: The formulation of any preceding paragraph further comprising one or more chelating agents, wherein the one or more chelating agents comprise tetrasodium N,N-bis(carboxymethyl)-L-glutamate and optionally wherein the one or more chelating agents are present in an amount of 0.25 to 10 wt. % based on the weight of the aqueous composition, preferably 0.5 to 8 wt. %, 0.75 to 6 wt. % or 1 to 4 wt. %, based on the weight of the aqueous composition.

Paragraph 36: The formulation of any preceding paragraph further comprising one or more chelating agents, wherein the one or more chelating agents comprise tetrasodium N,N-bis(carboxymethyl)-L-glutamate and are present in an amount of 1 to 4 wt. %, based on the weight of the aqueous composition.

Paragraph 37: The formulation of any preceding paragraph further comprising a pH buffer, wherein the pH buffer comprises citric acid and is optionally present in amount of 0.025 to 2 wt. %, preferably 0.05 to 1 wt. %, 0.075 to 0.75 wt. % or 0.1 to 0.5 wt. %, based on the weight of the formulation.

Paragraph 38: The formulation of any preceding paragraph, wherein the aqueous composition comprises water in an amount of 20 to 90 wt. % based on the weight of the aqueous composition.

Paragraph 39: A formulation comprising at least one biocidal active ingredient and an aqueous composition, wherein the aqueous composition comprises:
(a) sucrose distearate;
(b) dimethyl succinate;
(c) glycerol; and
(d) one or more of capryl glucoside, lauryl glucoside and coco glucoside,
(e) tetrasodium N,N-bis(carboxymethyl)-L-glutamate,
(f) citric acid, and
(g) water
wherein the aqueous composition is a colloid or a suspension,
wherein the at least one biocidal active ingredient is present in an amount of at least 0.06% based on the weight of the formulation, and
wherein the aqueous composition is present in an amount of 0.03% to 3% based on the weight of the formulation.

Paragraph 40: A formulation comprising at least one biocidal active ingredient and an aqueous composition, wherein the aqueous composition comprises:
(a) 4 to 15 wt. % based on the weight of the aqueous composition of sucrose distearate;
(b) 4 to 15 wt. % based on the weight of the aqueous composition of dimethyl succinate;
(c) 6 to 15 wt. % based on the weight of the aqueous composition of glycerol; and
(d) 10 to 15 wt. % based on the weight of the aqueous composition of one or more of capryl glucoside, lauryl glucoside and coco glucoside,
(e) 1 to 4 wt. %, based on the weight of the aqueous composition of tetrasodium N,N-bis(carboxymethyl)-L-glutamate,
(f) 0.1 to 0.5 wt. % based on the weight of the aqueous composition of citric acid, and
(g) 20 to 90 wt. % based on the weight of the aqueous composition of water wherein the aqueous composition is a colloid or a suspension,
wherein the at least one biocidal active ingredient is present in an amount of at least 0.06% based on the weight of the formulation, and
wherein the aqueous composition is present in an amount of 0.03% to 3% based on the weight of the formulation.

Paragraph 41: The formulation of any preceding paragraph, wherein the aqueous composition is an oil in water emulsion.

Paragraph 42: The formulation of any preceding paragraph, wherein the biocidal active ingredient is selected from one or more of a quaternary ammonium compound, alcohol or chlorine-releasing agent.

Paragraph 43: The formulation of any preceding paragraph, wherein the at least one biocidal active ingredient is a quaternary ammonium compound.

Paragraph 44: Use of a formulation as defined in any preceding paragraph as a biocidal agent.

Paragraph 45: Use of a formulation as defined in any preceding paragraph as a biocidal agent in bathrooms or kitchens.

Paragraph 46: Use of a formulation as defined in any preceding paragraph as a biocidal agent in hospitals.

Paragraph 47: Use of a formulation as defined in any preceding paragraph as a biocidal agent to disinfect surgical and/or equipment.

Paragraph 48: Use of a formulation as defined in any preceding paragraph as a biocidal agent in food processing facilities.

Paragraph 49: Use of a formulation as defined in any preceding paragraph as a biocidal agent to treat plants, crops, meat, fruits, vegetables and livestock.

Paragraph 50: A method of manufacturing the formulation of any of paragraph 1 to 43, comprising the steps of:
(a) forming the aqueous composition by:
  (i) mixing a sugar ester and a dialkyl ester with water,
  (ii) adding the one or more surfactants, and
  (iii) adding the humectant; and
(b) mixing the at least one biocidal active ingredient with the aqueous composition.

Paragraph 51: A method of manufacturing the formulation of any of paragraph 1 to 43, comprising the steps of:
(a) forming the aqueous composition by:
  (i) mixing a sucrose ester and a dialkyl ester with water,
  (ii) adding the one or more surfactants, and
  (iii) adding the humectant; and
(b) mixing at least 0.06% of the at least one biocidal active ingredient with at least 0.03% of the aqueous composition based on the weight of the formulation.

Paragraph 52: The method of paragraph 51, wherein the sugar ester is a sucrose ester, optionally sucrose stearate or sucrose distearate is present in an amount of 1 to 45 wt. % based on the weight of the aqueous composition, optionally wherein the dialkyl ester is dimethyl succinate is present in an amount of 1 to 45 wt. % based on the weight of the aqueous composition, optionally wherein the humectant is present in an amount of 1 to 40 wt. % based on the weight of the aqueous composition, optionally wherein the one or more surfactants are present in an amount of 2 to 45 wt. % based on the weight of the aqueous composition.

Paragraph 53: A method of manufacturing the formulation of any of paragraph 1 to 43, comprising the steps of:

(a) forming the aqueous composition by:
  (i) mixing sucrose distearate and dimethyl succinate with water,
  (ii) adding one or more of capryl glucoside, lauryl glucoside and coco glucoside, and
  (iii) adding glycerol; and
(b) mixing at least 0.06% of the at least one biocidal active ingredient with at least 0.03% of the aqueous composition based on the weight of the formulation.

Paragraph 54: The method of any of paragraphs 50 to 53, further comprising adding one or more chelating agents in step (i), preferably wherein the one or more chelating agents are present in an amount of 0.25 to 10 wt. % based on the weight of the aqueous composition.

Paragraph 55: A method of manufacturing the formulation of any of paragraph 1 to 43, comprising the steps of:

(a) forming the aqueous composition by:
  (i) mixing 4 to 15 wt. % based on the weight of the aqueous composition sucrose distearate and 4 to 15 wt. % based on the weight of the aqueous composition of dimethyl succinate with 20 to 90 wt. % based on the weight of the aqueous composition of water,
  (ii) adding 6 to 15 wt. % based on the weight of the aqueous composition of one or more of capryl glucoside, lauryl glucoside and coco glucoside, and
  (iii) adding 10 to 15 wt. % based on the weight of the aqueous composition of glycerol; and
(b) mixing at least 0.06% of the at least one biocidal active ingredient with at least 0.03% of the aqueous composition based on the weight of the formulation.

Paragraph 56: A method of manufacturing the formulation of any of paragraph 1 to 43, comprising the steps of:

(a) forming the aqueous composition by:
  (i) mixing 4 to 15 wt. % based on the weight of the aqueous composition sucrose distearate, 0.25 to 10 wt. % based on the weight of the aqueous composition of a chelating agent and 4 to 15 wt. % based on the weight of the aqueous composition of dimethyl succinate with 20 to 90 wt. % based on the weight of the aqueous composition water,
  (ii) adding 6 to 15 wt. % based on the weight of the aqueous composition of one or more of capryl glucoside, lauryl glucoside and coco glucoside, and
  (iii) adding 10 to 15 wt. % based on the weight of the aqueous composition glycerol;
(b) mixing at least 0.06% of the at least one biocidal active ingredient with at least 0.03% the aqueous composition based on the weight of the formulation; and
(c) and adding a pH buffer.

Paragraph 57: A formulation comprising at least one biocidal active ingredient and an aqueous composition, wherein the aqueous composition comprises:

(a) a sugar ester;
(b) a dialkyl ester;
(c) a humectant; and
(d) one or more surfactants, wherein the aqueous composition is a colloid or a suspension, and wherein the formulation achieves a mean reduction of $>5^{Log10}$ in viable bacteria within 5 minutes.

Paragraph 58: The formulation of paragraph 57, wherein the formulation achieves a mean reduction of $>5^{Log10}$ in viable bacteria within 1 minute.

Paragraph 59: The formulation of paragraph 57, wherein the formulation achieves a mean reduction of $>6^{Log10}$ in viable bacteria within 5 minutes.

Paragraph 60: The formulation of paragraph 57, wherein the formulation achieves a mean reduction of $>6^{Log10}$ in viable bacteria within 1 minute.

Paragraph 61: The formulation of paragraph 57, wherein the viable bacteria is at least one of *Pseudomonas aeruginosa, Staphylococcus aureus, Escherichia coli*, and *Enterococcus* hirae.

Paragraph 62: The formulation of any of paragraphs 57 to 61, wherein the sugar ester derived from the esterification of a sugar and a fatty acid.

Paragraph 63: The formulation of any of paragraphs 57 to 62, wherein the dialkyl ester which is not a sugar ester.

Paragraph 64: The formulation of any of paragraphs 57 to 63, wherein the one or more surfactants comprise a glycoside or a combination of glycosides.

Paragraph 65: A formulation comprising at least one biocidal active ingredient and an aqueous composition, wherein the aqueous composition comprises:

(a) a sugar ester in an amount of 4-15 wt. % based on the weight of the aqueous composition;
(b) a dialkyl ester in an amount of 4-15 wt. % based on the weight of the aqueous composition;
(c) a humectant in an amount of 6-15 wt. % based on the weight of the aqueous composition; and
(d) one or more surfactants in an amount of 4-35 wt. % based on the weight of the aqueous composition, wherein the aqueous composition is a colloid or a suspension, and wherein the formulation achieves a mean reduction of $>5^{Log10}$ in viable bacteria within 5 minutes.

Paragraph 66: The formulation of paragraph 65, wherein the formulation achieves a mean reduction of $>5^{Log10}$ in viable bacteria within 1 minute.

Paragraph 67: The formulation of paragraph 65, wherein the formulation achieves a mean reduction of $>6^{Log10}$ in viable bacteria within 5 minutes.

Paragraph 68: The formulation of paragraph 65, wherein the formulation achieves a mean reduction of $>6^{Log10}$ in viable bacteria within 1 minute.

Paragraph 69: The formulation of paragraph 65, wherein the viable bacteria is at least one of *Pseudomonas aeruginosa, Staphylococcus aureus, Escherichia coli*, and *Enterococcus* hirae.

Paragraph 70: The formulation of any of paragraphs 65 to 69, wherein the sugar ester derived from the esterification of a sugar and a fatty acid.

Paragraph 71: The formulation of any of paragraphs 65 to 70, wherein the dialkyl ester which is not a sugar ester.

Paragraph 72: The formulation of any of paragraphs 65 to 71, wherein the one or more surfactants comprise a glycoside or a combination of glycosides.

The invention claimed is:

1. A formulation comprising at least one biocidal active ingredient and an aqueous composition, wherein the aqueous composition comprises:

(a) a sugar ester derived from the esterification of a sugar and a fatty acid in an amount of 4-15 wt. % based on the weight of the aqueous composition;

(b) a dialkyl ester which is not a sugar ester in an amount of 4-15 wt. % based on the weight of the aqueous composition;

(c) a humectant in an amount of 6-15 wt. % based on the weight of the aqueous composition; and (d) one or more surfactants comprising a glycoside or a combination of glycosides in an amount of 4-35 wt. % based on the weight of the aqueous composition, wherein the aqueous composition is a colloid or a suspension.

2. The formulation of claim 1, wherein the sugar ester is a sucrose ester, fructose ester, lactose ester or glucose ester; wherein the sugar ester is a sucrose ester optionally sucrose stearate or sucrose distearate.

3. The formulation of claim 1, wherein the dialkyl ester is a dialkyl ester of an acid selected from succinic acid, carbonic acid, glutaric acid or adipic acid; wherein the dialkyl ester is dimethyl succinate, dimethyl carbonate, dimethyl glutarate or dimethyl adipate.

4. The formulation of claim 1, wherein the humectant is an alkyl polyol or combination of alkyl polyols, wherein the alkyl polyol or combination of alkyl polyols is an alkyl diol, optionally propylene glycol, butylene glycol or hexylene glycol, or an alkyl triol optionally glycerol, or an alkyl polyol optionally sorbitol, xylitol, or glycerol.

5. The formulation of claim 1, wherein the one or more surfactants comprise one or more glucosides; wherein the glucosides are selected from one or more of capryl glucoside, lauryl glucoside, and coco glucoside and are optionally present in an amount of 7 to 25 wt. % or 10 to 15 wt. %, based on the weight of the aqueous composition.

6. The formulation of claim 1, further comprising one or more chelating agents; wherein the one or more chelating agents comprise tetrasodium N,N-bis(carboxymethyl)-L-glutamate and are optionally present in an amount of 0.25 to 10 wt. %, 0.5 to 8 wt. %, 0.75 to 6 wt. % or 1 to 4 wt. % based on the weight of the aqueous composition.

7. The formulation of claim 1, further comprising a pH buffer, preferably wherein the pH buffer is citric acid and optionally wherein the pH buffer is present in amount of 0.025 to 2 wt. %, 0.05 to 1 wt. %, 0.075 to 0.75 wt. % or 0.1 to 0.5 wt. % based on the weight of the formulation.

8. The formulation of claim 1, wherein the aqueous composition comprises water in an amount of 20 to 90 wt. % based on the weight of the aqueous composition.

9. The formulation of claim 1, wherein the aqueous composition is an oil in water emulsion.

10. The formulation of claim 1, wherein the at least one biocidal active ingredient is a biocide, optionally wherein the biocidal active ingredient is selected from one or more of a quaternary ammonium compound, alcohol or chlorine-releasing agent.

11. The formulation of claim 1, wherein the at least one biocidal active ingredient is present in the formulation in an amount of at least 0.06 wt. % based on the weight of the formulation and optionally wherein the aqueous composition is present in the formulation in an amount of at least 0.03 wt. % based on the weight of the formulation.

12. The formulation of claim 1, wherein the formulation provides biocidal activity when applied to a site, surface, or material in need of biocidal treatment.

* * * * *